United States Patent
Welle

(10) Patent No.: US 10,393,565 B2
(45) Date of Patent: Aug. 27, 2019

(54) DETERMINATION OF CONTAINER AND INTERFERENCE POINT PROFILES

(71) Applicant: VEGA GRIESHABER KG, Wolfach (DE)

(72) Inventor: Roland Welle, Hausach (DE)

(73) Assignee: VEGA GRIESHABER KG, Wolfach (DE)

(*) Notice: Subject to any disclaimer, the term of this patent is extended or adjusted under 35 U.S.C. 154(b) by 338 days.

(21) Appl. No.: 15/308,119

(22) PCT Filed: Jun. 3, 2014

(86) PCT No.: PCT/EP2014/061502
§ 371 (c)(1),
(2) Date: Nov. 1, 2016

(87) PCT Pub. No.: WO2015/185116
PCT Pub. Date: Dec. 10, 2015

(65) Prior Publication Data
US 2017/0102260 A1      Apr. 13, 2017

(51) Int. Cl.
*G01F 23/284*     (2006.01)
*G01F 17/00*      (2006.01)
*G01F 23/296*     (2006.01)

(52) U.S. Cl.
CPC .......... *G01F 23/284* (2013.01); *G01F 17/00* (2013.01); *G01F 23/296* (2013.01)

(58) Field of Classification Search
CPC ....... G01F 17/00; G01F 23/296; G01F 23/284
(Continued)

(56) References Cited

U.S. PATENT DOCUMENTS 5,365,178 A * 11/1994 Van Der Pol ......... G01F 23/284
324/644
5,587,969 A * 12/1996 Kroemer ............... G01F 23/296
367/908

(Continued)

FOREIGN PATENT DOCUMENTS

DE       43 39 441 A1     5/1995
DE       101 06 176 A1    8/2002
(Continued)

OTHER PUBLICATIONS

International Search Report dated Aug. 5, 2014 in PCT/EP2014/061502 filed Jun. 3, 2014.
(Continued)

*Primary Examiner* — Marcus E Windrich
(74) *Attorney, Agent, or Firm* — Oblon, McClelland, Maier & Neustadt, L.L.P.

(57) ABSTRACT

A method for determining a volume or a mass of a filling material is provided, in which firstly an empty profile detection mode is assumed in the absence of a filling material, and then a volume or mass determination mode is assumed when the filling material is present. In the empty profile detection mode, an interference point profile is created from echo curves obtained by scanning a container surface. The interference point profile is then taken into account when determining the volume or the mass of the filling material in the volume or mass determination mode, such that volumes or masses of the filling material are determined with increased accuracy.

12 Claims, 6 Drawing Sheets

(58) Field of Classification Search
USPC .......................................................... 342/124
See application file for complete search history.

(56) References Cited

U.S. PATENT DOCUMENTS

| | | | | |
|---|---|---|---|---|
| 6,759,977 | B1* | 7/2004 | Edvardsson | G01F 23/284 342/124 |
| 2005/0035769 | A1* | 2/2005 | Otto | G01F 23/284 324/644 |
| 2009/0299662 | A1 | 12/2009 | Fehrenbach et al. | |
| 2010/0307251 | A1* | 12/2010 | Welle | G01S 7/2922 73/627 |
| 2011/0094299 | A1* | 4/2011 | Muller | G01F 23/0076 73/290 V |
| 2011/0238352 | A1* | 9/2011 | Griessbaum | G01F 23/284 702/100 |
| 2012/0221261 | A1 | 8/2012 | Fehrenbach et al. | |
| 2013/0110420 | A1 | 5/2013 | Griessbaum et al. | |
| 2013/0118251 | A1* | 5/2013 | Welle | G01F 23/284 73/290 R |
| 2013/0269414 | A1* | 10/2013 | Ferraro | G01F 23/284 73/1.73 |
| 2014/0210488 | A1* | 7/2014 | Weber | G01F 23/284 324/644 |
| 2016/0153822 | A1* | 6/2016 | Gorenflo | G01F 23/0061 73/290 V |

FOREIGN PATENT DOCUMENTS

| | | |
|---|---|---|
| DE | 10 2004 041 857 A1 | 3/2006 |
| EP | 1 431 724 A1 | 6/2004 |
| EP | 2 128 576 A1 | 12/2009 |
| EP | 2 372 318 A1 | 10/2011 |
| EP | 2 527 802 A1 | 11/2012 |
| WO | 03/016835 A1 | 2/2003 |
| WO | WO 2010/003656 A1 | 1/2010 |

OTHER PUBLICATIONS

English translation of the International Preliminary Report on Patentability and Written Opinion dated Dec. 15, 2016 in PCT/EP2014/061502.

* cited by examiner

DETERMINATION OF CONTAINER AND INTERFERENCE POINT PROFILES

FIELD OF THE INVENTION

The invention relates to the determination of the volume and mass of filling materials or bulk materials. The invention relates in particular to a method for determining the volume or the mass of a filling material, to a fill level measurement device for determining the volume or the mass of a filling material, to a program element, and to a computer-readable medium.

BACKGROUND

Fill level measurement devices are known that can be used for three-dimensional fill level measurement. "Three-dimensional fill level measurement" is understood to mean that the surface form (topology) of the filling material can be measured. Such detection of the topology of the filling material surface is achieved for example by scanning the surface, by correspondingly tilting or rotating the antenna and/or the entire fill level measurement device. In addition to this mechanical control of the main emission direction of the fill level radar antenna, electronic beam control is also possible (or a combination of the two).

An advantage of this three-dimensional fill level measurement is, inter alia, that determining the surface topology of the bulk material surface permits more accurate determination of the volume and/or the mass of the filling material, since, in the case of a coarse-grained bulk material or a moving filling material, the surface often does not extend in the horizontal plane.

SUMMARY OF THE INVENTION

An object of the invention is that of further improving the determination of the volume or mass of filling materials.

This object is achieved by the features of the independent claims. Developments of the invention can be found in the dependent claims and the following description.

According to a first aspect of the invention, a method for determining the volume or the mass of a filling material is specified, in which firstly an empty profile detection mode is assumed, in the absence of a filling material. In the empty profile detection mode, a transmission signal is emitted by the antenna of the fill level measurement device to the surface of the filling material in various directions, and echo curves from various regions of the surface of the filling material are detected. This detection of echo curves from various regions of the surface can be made possible by a direction change of the transmission signal by changing the main emission direction of the transceiver antenna of the fill level measurement device. Alternatively or in addition, the detection of echo curves from various regions of the surface can be made possible by changing the main receive direction of the transceiver antenna of the fill level measurement device.

In the present context, the absence of a filling material can be understood as a state in which residual amounts of a filling material which may be present in the container do not lead to significant reflections of the transmission signal. It is therefore possible that a container that was previously filled may still contain traces of the filling medium after emptying but, in the context of the present invention, an absence of a filling material can be assumed.

The main emission direction and/or main receive direction of the antenna can occur by tilting and/or rotating the antenna, by tilting and/or rotating the entire fill level measurement device, by rotating a mirror that deflects the transmission signal, by rotating one or more prisms, or in another mechanical manner. Alternatively or in addition thereto, electronic beam control ("digital beam forming") is also possible, in which case an antenna array is used.

The transmission signal, which is reflected at least at the surface of the filling material, is then received by the antenna or by a plurality of receive antennas, and echo curves are generated from the reflected and received transmission signal. The corresponding emission direction of the transmission signal from which the relevant echo curve originates is also detected. It can also be provided to detect the direction from which signals are received by the antenna.

In other words, the empty container is scanned in the empty profile detection mode by continuously or discontinuously (incrementally) changing the main emission direction and/or the main receive direction of the fill level measurement device. In each case, an echo curve is generated for selected main emission directions and/or main receive directions. The interference point profile in the container can then be determined from this series of echo curves, which profile corresponds to the position of interfering objects.

For example, it is possible to identify, in each echo curve, those portions of the echo curve that originate from interfering objects, which portions have therefore occurred because the transmission signal was reflected at the interfering object in question. The interference point profile can therefore consist, for example, of individual portions of a series of echo curves, each of these echo curves being generated at a specific main emission direction of the antenna/of the fill level measurement device.

However, it is also possible for a topology of the interference points in the container to be calculated from these echo curves, and for this topology to be the interference point profile.

In each case, this interference point profile makes it possible to identify the particular angle of the main emission direction at which the main emission direction intersects an interfering object, and at which, therefore, the transmission signal is reflected by an interfering object.

When a filling material is present, the fill level measurement device assumes a volume or mass determination mode, in which further echo curves are generated. The further echo curves can be generated as described above, by scanning the surface of the filling material. The volume or the mass of the filling material is then determined from the further echo curves and taking account of the interference point profile.

The result of the volume or mass determination is thus further improved, since the effects of the interference points, which can distort the measurement result, can be eliminated.

It should be noted, at this point, that the filling material may be a liquid or a bulk material.

When, in the following, a container is mentioned in which the filling material is located, this can be understood to be a container in the literal sense, which contains the filling material, a conveyor belt, on which the bulk material is located, or an open stockpile.

The term "interfering object" used in the following refers to an object which is located between the antenna of the fill level measurement device and the filling material, but which does not form part of the container or of the conveyor belt. The interfering object is therefore in particular not the container base or the container walls, and likewise not the filling material itself. Rather, an interfering object of this kind is a foreign body in the container, for example a ladder or a pipe.

According to a further embodiment of the invention, the interference point profile is determined from the echo curves that were generated in the empty profile detection mode, also using the geometry of a container in which the filling material is located.

Taking account of the container geometry when determining the interference point profile makes it possible to avoid reflections that originate from the container from being taking into account when creating the interference point profile.

According to a further embodiment of the invention, the overall profile is determined from the echo curves that were generated in the empty profile detection mode, the overall profile being a combination of the container profile and the interference point profile. The interference point profile is then determined from the overall profile.

Therefore, the empty container, including the interfering objects, is scanned, and the container profile is then removed from the overall profile, with the result that only the interference profile remains.

The overall profile as well as the container profile and the interference point profile can each be a data record that makes it possible to find out in which main emission direction and at what distance from the fill level measurement device a part of the container or an interfering object is located. Accordingly, the coordinates of the corresponding reflectors (an interfering object or a part of the container) can be determined from this data record. It is not necessary for these profiles to be converted into a surface. For example, the data record can be shown in the form of a list (cf. FIG. 9) or in the manner of a matrix (cf. FIG. 10).

According to a further embodiment of the invention, the interference echo profile is determined from the overall profile using a consistency (i. e. continuity) analysis in order to divide the particular overall profile into a container profile and the interference point profile.

According to a further embodiment of the invention, the geometry of the container in which the filling material is located is determined from echo curves that were generated in the empty profile detection mode in the absence of a filling material and in the absence of interfering objects.

According to a further embodiment of the invention, the volume or the mass of the filling material is determined from the further echo curves that were generated in the volume or mass determination mode, and taking account of the geometry of the container in which the filling material is located.

According to a further embodiment of the invention, a topology curve that represents the surface topology of the filling material is determined from the further echo curves that were generated in the volume or mass determination mode. This step comprises eliminating those portions of the topology curve that are behind an interference point when viewed from the antenna of the fill level measurement device.

In other words, in the volume or mass determination mode, the surface topology of the filling material, including any possible interference points and parts of the container, is detected, and then those portions that originate from an interference point and thus form a shadow on the filling material surface are removed from the topology curve.

According to a further embodiment of the invention, the echo curves generated in the empty profile detection mode, and the associated angle of the main emission direction and/or the main receive direction of the antenna, are stored in a volatile and/or non-volatile memory of the fill level measurement device.

According to a further embodiment of the invention, the empty profile detection mode is assumed when a filling material is present, i.e. when the container or stockpile is partly filled.

According to a further aspect of the invention, a fill level measurement device is specified for determining the volume or the mass of a filling material according to a method described above and in the following.

According to an embodiment of the invention, the fill level measurement device is designed to be connected to a 4-20 mA two-wire line for supplying the fill level measurement device with the energy required for the measurement operation, and for transmitting the measured values generated by the fill level measurement device.

According to a further aspect of the invention, a program element is specified which, when executed on a processor of the fill level measurement device, instructs the fill level measurement device to carry out the steps described above and in the following.

According to a further aspect of the invention, a computer-readable medium is specified, on which a program element of the above-described type is stored.

The computer program product may be part of a piece of software which is stored on a processor of the fill level measurement device. The processor here can likewise be the subject matter of the invention. In addition, the program element can be a program element which uses the invention right from the start, and also a program element that, by an update, causes an existing program to use the invention.

In the following, embodiments of the invention will be described with reference to the figures.

DETAILED DESCRIPTION OF EMBODIMENTS

Figure 1:
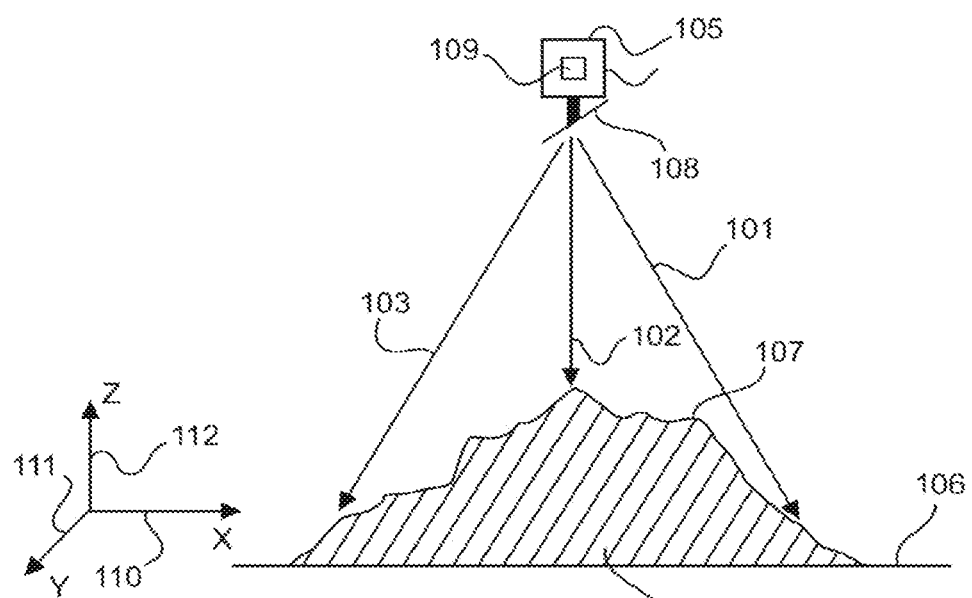
FIG. 1 shows a measurement arrangement for measuring bulk material.

The depictions in the drawings are schematic and not to scale.

Where the same reference numerals are used in different figures in the following description of the figures, they denote the same or similar elements. However, the same or similar elements may also be denoted by different reference numerals.

FIG. 1 shows a fill level measurement device 105, for example a fill level radar device, that is capable of detecting the topology of a filling material surface. The measurement device comprises a transceiver antenna 108 and an electronics unit 109 connected thereto.

The measurement device is capable of detecting echo signals or echo curves from different angle ranges 101, 102, 103. For each detected echo curve, the distance from the relevant point of the surface of the bulk material 104 is determined. By numerically integrating these distance values, and when postulating a planar surface 106 below the bulk material, the volume of the bulk material stockpile 107 can be determined. In addition, when the density is known, the bulk material mass can be calculated.

Figure 2:
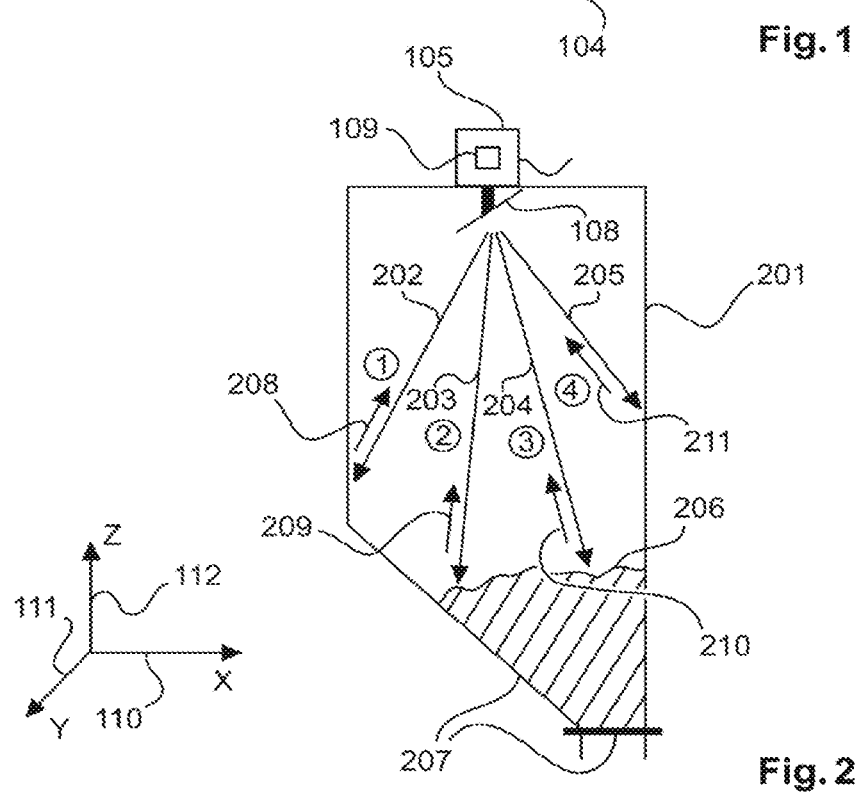
FIG. 2 shows a measurement arrangement for measuring a filling material in a container.

The conditions are completely different in containers that are typical in industry. FIG. 2 shows a corresponding example. The antenna 108 emits a transmission signal 202, 203, 204, 205 towards the filling material at a plurality of angles. The reflected transmission signal 208, 209, 210, 211 is subsequently received again by the antenna.

In this case, integrating the distance values detected for the angular directions 1 to 4 can lead to an entirely false result. Firstly, in this case no distinction is made between reflections from the container 201 and those from the bulk material 206. Secondly, the oblique profile of the container base 207 is not taken into account in any way when calculating the volume.

Figure 3:
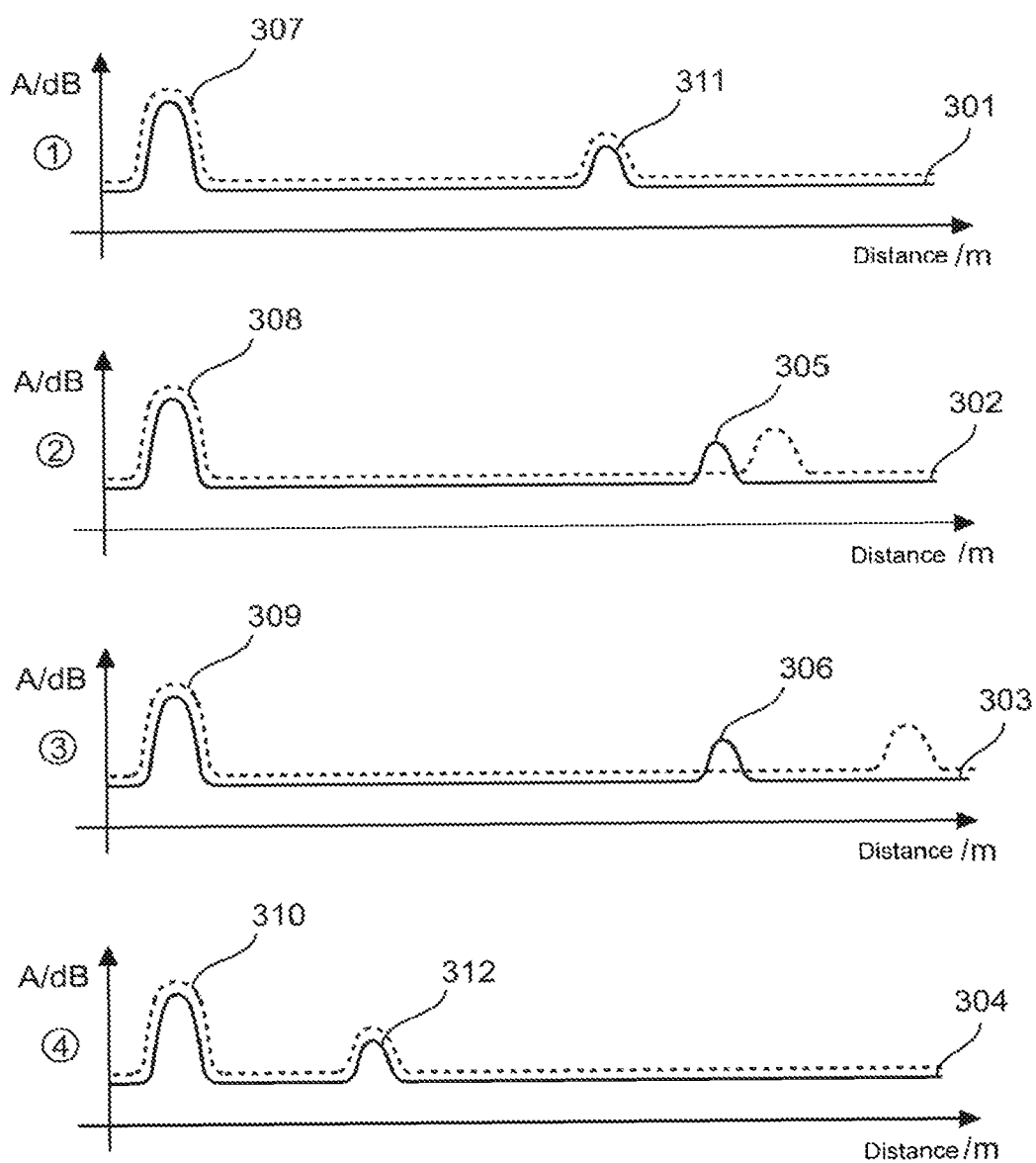
FIG. 3 shows examples of echo curves according to an embodiment of the invention.

FIG. 3 shows a plurality of echo curves according to an embodiment of the invention. The radar measurement device is transferred into an empty profile detection mode immediately after being installed on an empty container 201 (cf. FIG. 2). In this case, the radar measurement device detects the echo curves from different angle ranges 202, 203, 204, 205 of the empty container and stores said curves, together with the respective angles, directly or in a compressed form in the memory (volatile and/or non-volatile) of the measurement device.

The corresponding echo curves 307, 308, 309, 310 are shown by dashed lines in FIG. 3. In addition, the topology of the empty container (i.e. the distance from the container base and/or the container wall) is calculated on the basis of the respective detection angles.

During the subsequent normal operating mode of the device, which is also referred to in this context as the volume or mass determination mode, echo curves 301, 302, 303, 304 are then continuously detected from the different regions of the container and compared with the previously learned echo curves of the empty container. In this manner, it is possible to distinguish between reflections 305, 306 from the filling material surface and reflections 311, 312 from the container surface.

In addition, the volume of the bulk material can be correctly determined, taking account of the topology of the empty container and using the echo identified as originating from the filling material.

Figure 4:
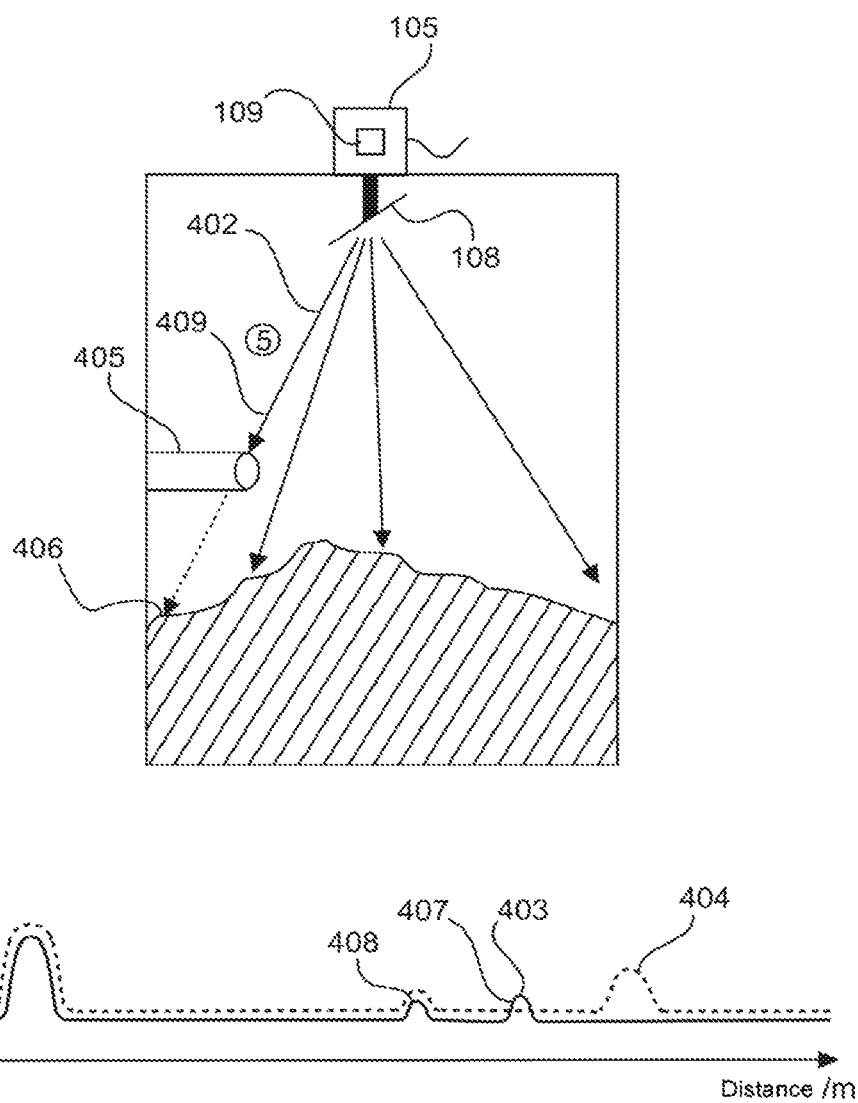
FIG. 4 shows a measurement arrangement and echo curves according to an embodiment of the invention.

The above-mentioned storage of the echo curves of the empty container can advantageously also be used to simplify the identification of the echo caused by the bulk material. FIG. 4 shows a corresponding example. The radar measurement device 105 detects, in angular direction no. 5 (402), an echo curve 403 that also comprises an echo 408 of the pipe 405 located in the container, in addition to the echo 407 caused by the filling material surface 406. Deciding which echo originates from the bulk material surface 406 becomes trivial when the detected echo curve 403 is compared with the echo curve 404 of the empty container at the same angular position.

The conditions set out above always arise when the physical extension of an interfering object or interferer 405 is less than the width of the radar beam 409 at the corresponding point, since only then can reflections from the region behind the interfering object also be detected and processed.

However, the conditions are completely different when the above-mentioned emission over an interfering object between the radar measurement device and the bulk material surface does not occur.

Figure 5:
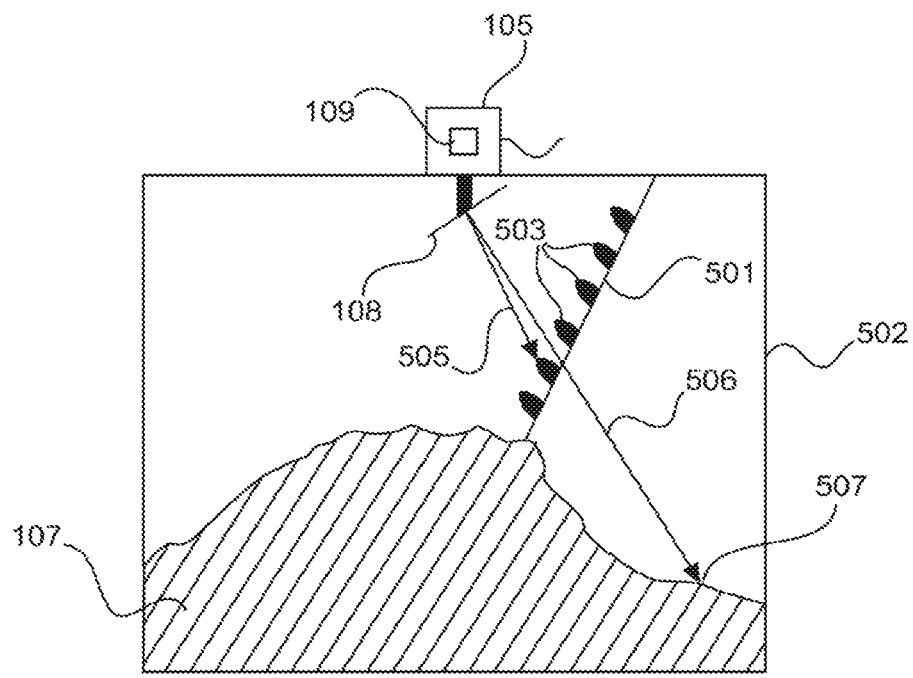
FIG. 5 shows a measurement arrangement according to a further embodiment of the invention.

FIG. 5 shows a corresponding situation. A ladder 501 located in the container 502 has a plurality of steps 503 that, on account of the small distance from the radar measurement device 105, cannot be emitted over by said device, i.e. almost all of the energy of the radar signal is reflected at the steps when the main beam direction 505 is correspondingly positioned. However, if the main beam direction of the radar measurement device is pointing in a direction 506 that permits propagation between the steps, the distance from the filling material surface 507 can then be correctly determined.

If an empty profile detection is carried out in the container according to FIG. 5, i.e. if the empty container were measured by the radar measurement device, the ladder could thus be erroneously detected as a container boundary. A subsequent calculation of the volume in the container would be incorrect in principle.

Figure 6:
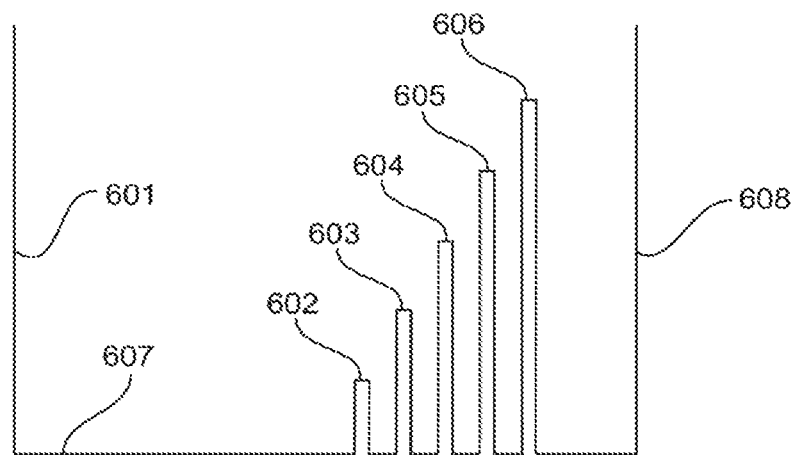
FIG. 6 shows an interference point profile according to an embodiment of the invention.

FIG. 6 shows a profile of the apparently empty container 502 that has been detected by the radar measurement device, the position of the container walls 601, 608 and of the container base 607 being correctly detected, but the distance values from the steps of the ladder erroneously giving an incorrect profile 602, 603, 604, 605, 606 of the container boundary.

The problem shown can be overcome in various ways. It is possible for the customer to input the fundamental container shape as a parameter. It is possible, from the profile of the detected surface and/or with the aid of consistency analyses, to further divide the determined profile (FIG. 6) into sub-profiles which can in turn be classified ("empty container", "inserts/interferers"). The empty profile of the container accordingly consists of the boundary lines 601, 607, 608, and the interference point profiles of the inserts consist of the profile 602, 603, 604, 605, 606.

Alternatively or in addition, an automatic plausibility analysis can be carried out in the fill level measurement device, in which atypical, i.e. solid, discontinuous, profiles of the surface of an empty container profile are identified and classified as interference point profiles.

The above-mentioned determination of two different profiles offers significant advantages for signal processing during ongoing operation.

Figure 7:
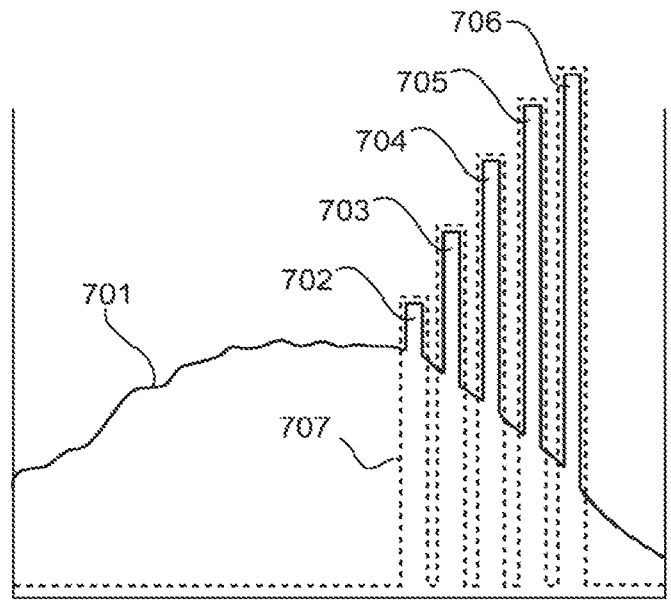
FIG. 7 shows an overall profile according to an embodiment of the invention.

FIG. 7 shows the corresponding principle. The raw topology 701 of the bulk material and the ladder, which is determined by the fill level measurement device according to known methods, contains the high measured values 702, 703, 704, 705, 706 caused by the rungs of the ladder. In a further signal processing step, the determined topology profile 701 is then compared with the previously determined interference point profile 707 (see the dashed curve), and portions of the topology curve that are below the interference point profile are eliminated.

Figure 8:
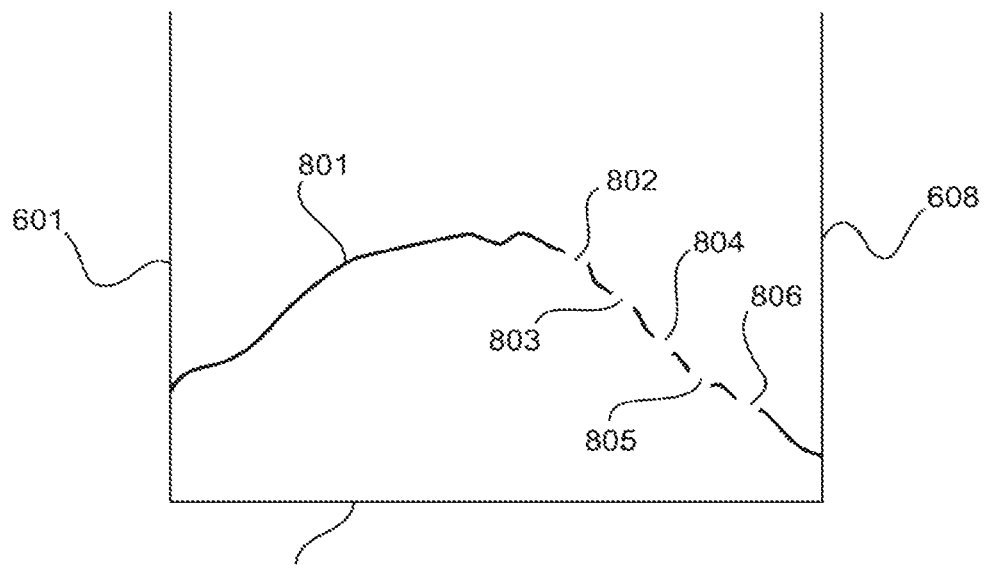
FIG. 8 shows a filling material profile after taking into account the interference point profile.

The curve line 801 in FIG. 8 shows the topology curve that results therefrom which is, in practice, two-dimensional, and has the resulting gaps 802, 803, 804, 805, 806.

In order to supplement the missing information from the angle ranges of the gaps, the topology curve can now advantageously be interpolated, preferably two-dimensionally interpolated. The actual volume calculation is made by numerically integrating the optionally interpolated topology curve, taking account of the topology curve of the empty container (empty profile 601, 607, 608) which can be previously subtracted.

Figures 9, 10:
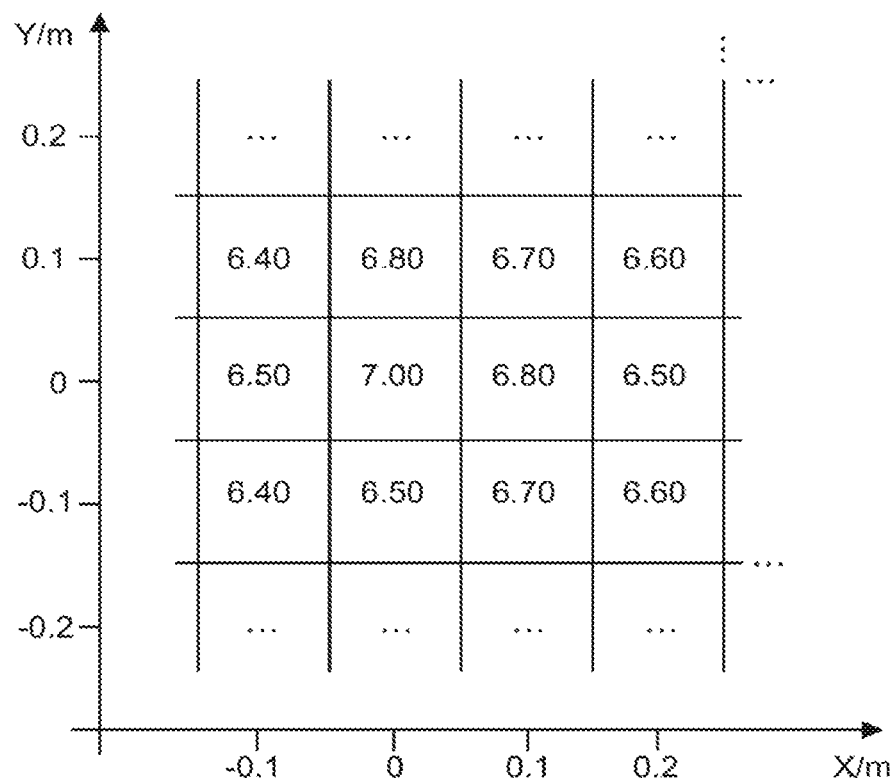
FIG. 9 shows a form of representation of a container profile or interference point profile according to an embodiment of the invention.
FIG. 10 shows an alternative form of representation according to an embodiment of the invention.

FIG. 9 shows a storage-optimised form of representation of an empty profile topology (also referred to in this context as a container profile) or of an interference echo topology, which is also referred to in this context as an interference point profile.

Instead of the entire echo curves 307, 308, 309, 310, here only the distance values from the corresponding container boundary or the corresponding interferer are stored in the memory of the radar device. For this purpose, each distance value must be marked with the associated angular position.

FIG. 10 shows an alternative form of representation of an empty profile topology or of an interfering echo topology in Cartesian coordinates. The coordinates of the matrix correspond to the location coordinates x 110, y 111 and z 112 of the radar measurement device or of the measured points of the container or of the interfering object. The matrix entries represent the distance, at the corresponding point, between the radar device and the surface of the container wall (empty profile topology), or between the radar device and the surface of an interferer in the container (interfering echo topology).

It should also be noted that "comprising" and "having" do not exclude the possibility of other elements or steps, and "one", "a" or "an" does not exclude the possibility of a plurality. It should also be pointed out that features or steps that have been described with reference to one of the above embodiments can also be used in combination with other features or steps of other embodiments described above. Reference numerals in the claims should not be treated as limiting.

The invention claimed is:

1. A method for determining a volume or a mass of a filling material, comprising:
   assuming, as a first mode, an empty profile detection mode in the absence of a filling material;
   emitting, in the first mode, a transmission signal in various directions;
   receiving, in the first mode, a reflected transmission signal;
   generating, in the first mode, at least one echo curve from the received reflected transmission signal, and detecting a corresponding direction from which the emitted transmission signal was reflected;
   determining an interference point profile from the generated at least one echo curve, indicating an absence or a presence of at least one interfering object and a corresponding at least one position of the at least one interfering object;
   identifying, based on the interference point profile, an angle of a main emission direction at which the main emission direction intersects the at least one interfering object;
   assuming, as a second mode, a volume or a mass determination mode when the filling material is present;
   generating, in the second mode, further echo curves, by emitting another transmission signal in various directions and receiving another reflected transmission signal; and
   determining, in the second mode, the volume or the mass of the filling material from the generated further echo curves, based on the determined interference point profile.

2. The method according to claim 1, wherein the determining the interference point profile from the at least one echo curve that was generated in the empty profile detection mode further comprises using a geometry of a container in which the absence of the filling material is assumed.

3. The method according to claim 1, further comprising:
   determining an overall profile from the at least one echo curve that was generated in the empty profile detection mode, wherein the overall profile is a combination of a container profile and the interference point profile; and
   removing the container profile from the overall profile, thereby determining the interference point profile.

4. The method according to claim 3, wherein the overall profile is subdivided, using a consistency analysis, into the container profile and the interference point profile.

5. The method according to claim 1, further comprising:
   determining a geometry of a container in which the filling material is located from the at least one echo curve that was generated in the empty profile detection mode in which the absence of the filling material is assumed and in the absence of interfering objects.

6. The method according to claim 1, wherein the determining the volume or the mass of the filling material from the generated further echo curves further comprises using a geometry of a container in which the filling material is located.

7. The method according to claim 1, further comprising:
   determining a topology curve that represents a surface topology of the filling material from the generated further echo curves, by eliminating portions of an initial topology curve that are below corresponding interference points on the determined interference point profile.

8. The method according to claim 1, further comprising:
   storing in a memory the at least one echo curve generated in the empty profile detection mode.

9. The method according to claim 1, wherein the first mode of assuming the empty profile detection mode is assumed when the filling material is present in a container.

10. A fill level measurement device configured to determine the volume or the mass of the filling material in accordance with the method according to claim 1.

11. The fill level measurement device according to claim 10, configured to be connected to a 4-20 mA two-wire line for supplying the fill level measurement device with energy for measurement operation, and for transmitting measured values generated by the fill level measurement device.

12. A nontransitory computer-readable storage medium having stored therein a program, which when executed on a processor of a fill level measurement device, instructs the fill level measurement device to carry out steps comprising:
   assuming, as a first mode, an empty profile detection mode in the absence of a filling material;
   emitting, in the first mode, a transmission signal in various directions;
   receiving, in the first mode, a reflected transmission signal;
   generating and storing, in the first mode, at least one echo curve from the received reflected transmission signal, and detecting a corresponding direction from which the emitted transmission signal was reflected;
   determining an interference point profile from the generated at least one echo curve, indicating an absence or a presence of at least one interfering object and a corresponding at least one position of the at least one interfering object;

identifying, based on the interference point profile, and angle of a main emission direction at which the main emission direction intersects the at least one interfering object;

assuming, as a second mode, a volume or a mass determination mode when the filling material is present;

generating, in the second mode, further echo curves, by emitting another transmission signal in various directions and receiving another reflected transmission signal; and determining, in the second mode, the volume or the mass of the filling material from the generated further echo curves, based on the determined interference point profile.

* * * * *